United States Patent
Bourlon et al.

(10) Patent No.: US 9,616,737 B2
(45) Date of Patent: Apr. 11, 2017

(54) LINK DEVICE FOR A MOTOR VEHICLE CRADLE

(71) Applicant: RENAULT s.a.s., Boulogne-Billancourt (FR)

(72) Inventors: Franck Bourlon, Aunay-Sous-Auneau (FR); Bertrand Dubreuil, Levallois-Perret (FR)

(73) Assignee: RENAULT s.a.s., Boulogne-Billancourt (FR)

(*) Notice: Subject to any disclaimer, the term of this patent is extended or adjusted under 35 U.S.C. 154(b) by 3 days.

(21) Appl. No.: 14/652,567

(22) PCT Filed: Oct. 21, 2013

(86) PCT No.: PCT/EP2013/071982
§ 371 (c)(1),
(2) Date: Jun. 16, 2015

(87) PCT Pub. No.: WO2014/095124
PCT Pub. Date: Jun. 26, 2014

(65) Prior Publication Data
US 2015/0328970 A1 Nov. 19, 2015

(30) Foreign Application Priority Data
Dec. 20, 2012 (FR) ...................................... 12 62392

(51) Int. Cl.
*B60K 5/00* (2006.01)
*B60K 5/12* (2006.01)
(Continued)

(52) U.S. Cl.
CPC ........ *B60K 5/1241* (2013.01); *B60G 21/0551* (2013.01); *B62D 21/11* (2013.01); *B60G 2204/1222* (2013.01); *B60G 2204/15* (2013.01)

(58) Field of Classification Search
CPC ...... B60K 5/12; B60K 5/1208; B60K 5/1225; B60K 5/1241; B62D 21/11; B62D 21/155
See application file for complete search history.

(56) References Cited

U.S. PATENT DOCUMENTS 4,762,336 A * 8/1988 Ogawa .................... B60G 3/06
267/257
5,251,932 A * 10/1993 Ide ..................... B60G 21/0551
180/427
(Continued)

FOREIGN PATENT DOCUMENTS

EP      2 050 597 A1    4/2009
FR      2 960 507 A1    12/2011
(Continued)

OTHER PUBLICATIONS

EPO machine translation of the description section of FR 2960507; printed Feb. 8, 2016.*
(Continued)

*Primary Examiner* — J. Allen Shriver, II
*Assistant Examiner* — Travis Coolman
(74) *Attorney, Agent, or Firm* — Oblon, McClelland, Maier & Neustadt, L.L.P.

(57) ABSTRACT

A link device for linking a motor vehicle cradle and a structural element of a body of the vehicle, the link device including a unitary ear including a base for connection to the cradle and an upper portion for connection to a structural element of the body. The ear includes a lateral portion including a bent U-shape for accommodating a bearing for guiding an anti-roll bar.

8 Claims, 2 Drawing Sheets

(51) Int. Cl.
*B60G 21/055* (2006.01)
*B62D 21/11* (2006.01)

(56) References Cited

U.S. PATENT DOCUMENTS

| | | | | |
|---|---|---|---|---|
| 5,718,407 A | * | 2/1998 | Lee | F16F 1/3842 180/312 |
| 5,788,264 A | * | 8/1998 | Adkins | B60G 21/0551 280/124.106 |
| 6,435,297 B1 | * | 8/2002 | Barber | B60G 21/0551 180/291 |
| 7,320,480 B2 | * | 1/2008 | Maruyama | B60G 21/0551 248/230.6 |
| 7,740,278 B2 | * | 6/2010 | Kakuta | B62D 3/12 280/777 |
| 2006/0082121 A1 | * | 4/2006 | Kakuta | B62D 3/12 280/777 |
| 2013/0028547 A1 | * | 1/2013 | Jang | B60G 21/0551 384/215 |
| 2013/0270029 A1 | * | 10/2013 | Young | B62D 21/155 180/274 |

FOREIGN PATENT DOCUMENTS

| | | |
|---|---|---|
| JP | H10-258763 A | 9/1998 |
| JP | 2004-050994 A | 2/2004 |
| WO | WO 2013178896 A1 | 12/2013 |

OTHER PUBLICATIONS

EPO machine translation of the description section of JPH10258763; printed Feb. 8, 2016.*

International Search Report issued Jan. 30, 2014, in PCT/EP2013/071982, filed Oct. 21, 2013.

French Preliminary Search Report and Written Opinion issued Oct. 2, 2013 in French Application No. 1262392, filed Dec. 20, 2012.

* cited by examiner

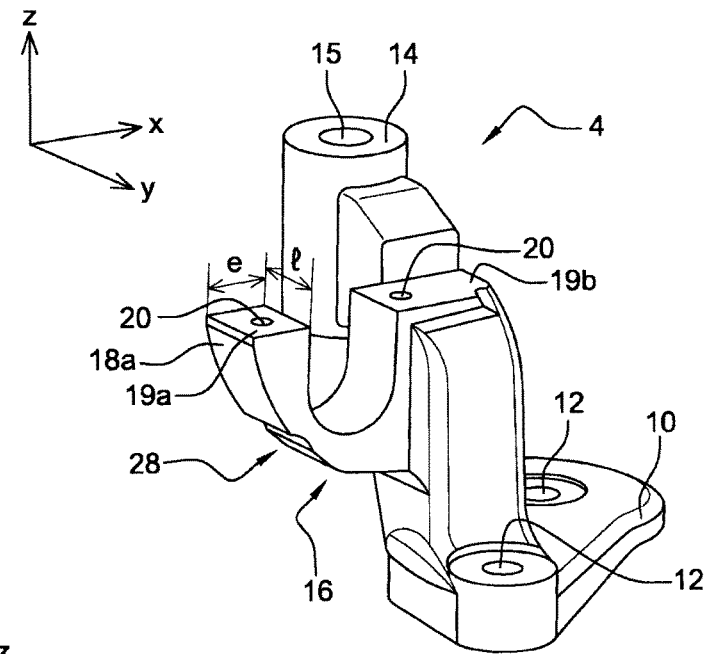
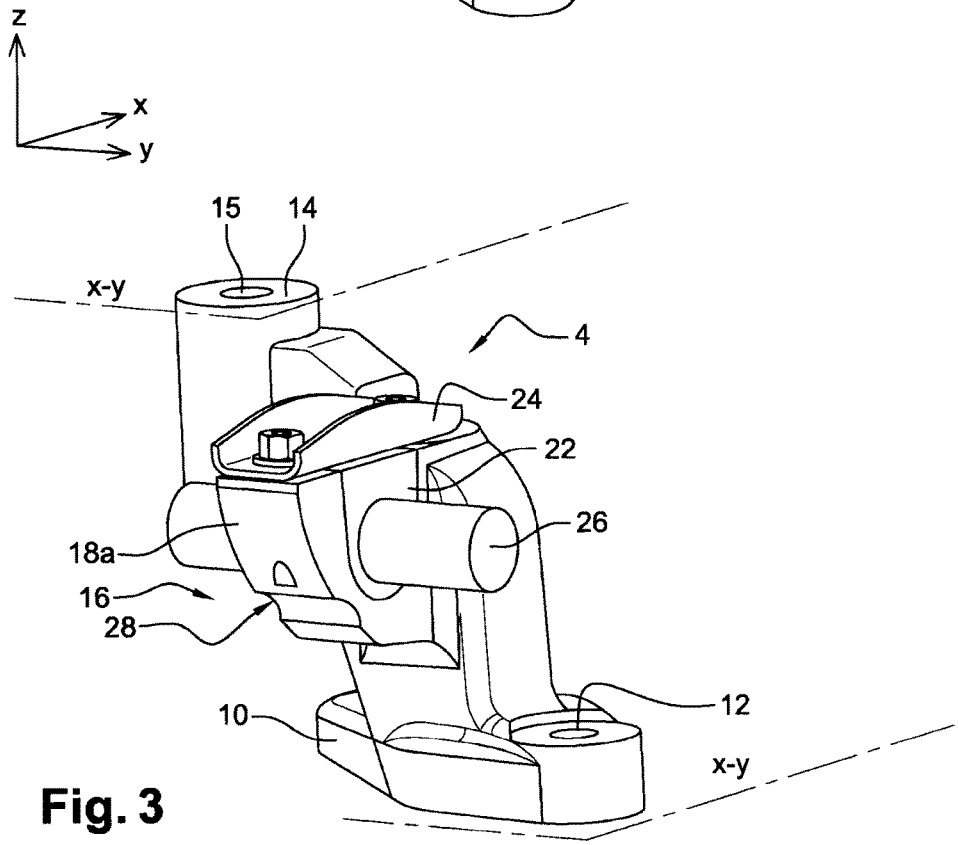

LINK DEVICE FOR A MOTOR VEHICLE CRADLE

BACKGROUND

The present invention relates to the technical field of motor vehicle cradles and proposes in particular a compact arrangement of a component for linking such cradles to the body structure of the vehicle. The invention also relates to a motor vehicle comprising such an arrangement.

Cradles connected to the longitudinal members by means of ears are already familiar in this technical field, for example in document FR 2 966 418, where the ear is attached to the elbow of a longitudinal member by an intermediate component.

SUMMARY

The present invention proposes to lighten such a structure by limiting the number of attachments, while retaining the properties of the assembly.

The present invention is accomplished with the help of a link device between a cradle of a motor vehicle and a structural element of the body of said vehicle, said device comprising a single-piece ear having a base for connection to the cradle as well as an upper portion for connection to a structural element of the body, characterized in that the ear has a lateral portion comprising a bent U-shape for accommodating a bearing for guiding an anti-roll bar.

According to other complementary characterizing features:
  the lateral portion of the ear is positioned towards the rear of the vehicle when the ear is attached to the cradle,
  the wall delimiting the bent shape of the lateral portion exhibits a local reduction in thickness,
  the lateral portion includes two plane surfaces at the extremities of the U-shape for the attachment of a compression plate for the guide bearing,
  the ear is made of aluminum, produced by molding, and the cradle is made of steel.

The present invention also relates to a motor vehicle including a body supporting a cradle, characterized in that the cradle is linked to a structural element of the body by a device according to one of the previously mentioned characterizing features.

Advantageously, the cradle is positioned at the front of the vehicle.

BRIEF DESCRIPTION OF THE DRAWINGS

The present invention will be more easily understood with the help of the following description, with reference to the accompanying figures, of which:

FIG. 2 is a view in perspective of a component for linking the cradle to the body structure, FIG. 3 is a view similar to FIG. 2, in which certain complementary elements are depicted.

DETAILED DESCRIPTION

Figure 1:
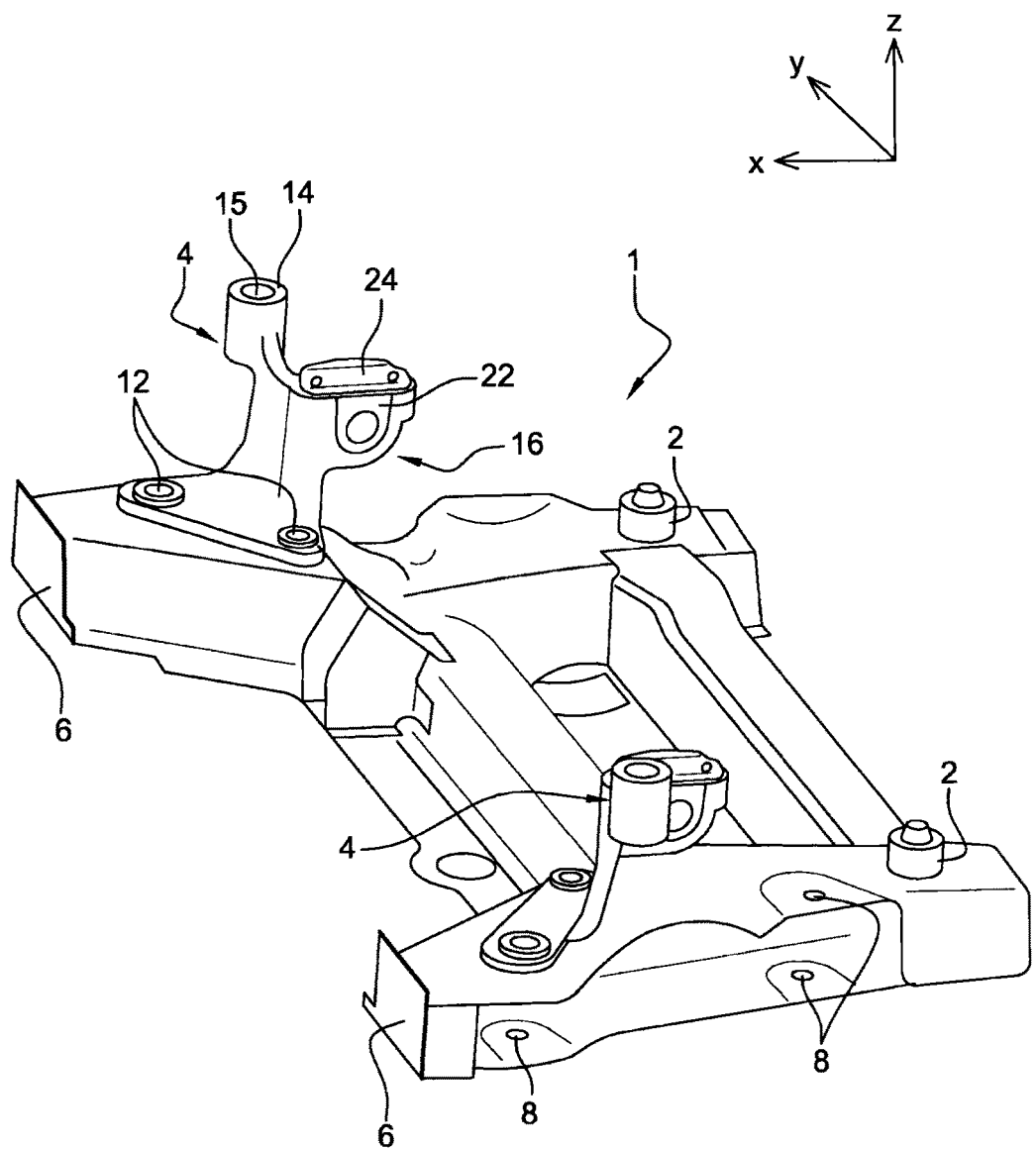
FIG. 1 is a view in perspective of an equipped cradle according to the present invention.

According to the invention, with reference to FIG. 1, a cradle 1, preferably made from steel, forming a frame, intended to be positioned at the front of a motor vehicle, between the lateral longitudinal members of said vehicle, includes rear attachment means as well as front attachment means. The latter are present in the form of ears 4, permitting an extension in the normalized vertical axis z.

In fact, in the front portion of the vehicle, the longitudinal members, in their anterior portion, exhibit an elevation for the connection of the power train.

The front portion of the cradle includes substantially vertical surfaces 6 for the connection of a shock absorber element, more commonly referred to as a "crash-box". The yoke structure of the cradle has attachment points 8 for the wheel support arms and for suspension elements, although these are not illustrated here.

According to the invention, the ears 4 for the attachment of the front portion of the cradle to the longitudinal members, being structural elements of the body, are in the form of a single-piece, preferably being produced as a casting, and advantageously as an aluminum casting, thereby allowing a reduction in weight.

Also with reference to FIGS. 2 and 3, these ears 4 exhibit a plane base 10 in the normalized x-y plane, possessing two holes 12 having a vertical axis z for the attachment of the ears to the upper portion of the cradle.

For the purpose of attaching the ears to the longitudinal members or equivalent structural elements of the body, the ears 4 include, in their upper portion, a substantially vertical hollow cylinder 14, the opening 15 permitting the linkage, by mechanical assembly of the screwing type, to the longitudinal members in the normalized x-y plane. Other methods of assembly, such as welding, may be envisaged for the attachment of the ears to the cradle and/or of the ears to the longitudinal members.

Between the base 10 and the cylinder 14, the ears exhibit a convex lateral portion 16, which is bent in a U-shape in a plane x-z, preferably facing towards the rear of the vehicle when the ear is attached to the cradle. The segments 18a, 18b forming the U exhibit a width t, in the y axis, that is sufficient to accommodate a bearing 22.

Furthermore, the segments 18a, 18b exhibit a thickness e, in the y axis, which may be variable according to the length of the segments, but which is sufficiently large at the free extremity of the segments for the resulting plane surfaces 19a, 19b in a plane x-y to permit the attachment of a plate 24, by means of threaded blind holes 20.

As shown in FIG. 3, the bent U-shape of the convex portion 16 accordingly permits the housing of a bearing 22, preferably made of rubber, for guiding an anti-roll bar 26, which is depicted partially in this figure. The plate 24 is a compression plate for the bearing.

Advantageously, the embodiment of the bent shape for accommodating the bearing exhibits a segment 18b produced from the solid portion of the ear, that is to say situated in the general plane y-z of the ear, and a segment 18a forming, together with the bent portion, an extension of the ear longitudinally towards the rear when the ear is positioned on the cradle.

According to a preferred embodiment of the invention, the segment 18a exhibits a local reduction in thickness in the form of a concavity 28. This hollow zone permits the mechanical strength to be decreased locally in order, in the event of impact, to provide a designated zone for the deformation, or the rupture, of the support for the anti-roll bar 26, in order for this anti-roll bar and its support to be capable of absorbing a part of the energy in the event of frontal impact but without generating high stresses and/or structural modifications to the ears 4 and the longitudinal members.

Thus, the realization of single-piece ears, preferably in aluminum, including a housing for a bearing for guiding an anti-roll bar, while exhibiting a crumple zone intended to allow said bar to "move out of the way" in the event of a frontal impact, reduces considerably the number of component parts and attachments required in order to implement the described functions in their entirety.

The invention claimed is:

1. A link device between a cradle of a motor vehicle and a structural element of a body of the vehicle, the link device comprising:
   a single-piece ear including a base to connect to the cradle, a middle portion that extends vertically from the base, and a first arm that extends from the middle portion and is configured to connect to the structural element of the body,
   wherein the ear includes a second arm that is a cantilever and extends longitudinally with respect to the cradle from the middle portion and includes a U-shaped bend to accommodate a bearing to guide an anti-roll bar, and
   wherein the second arm has an outer portion that includes a concavity.

2. The device as claimed in claim 1, wherein the second arm is positioned towards a rear of the vehicle when the ear is attached to the cradle.

3. The device as claimed in claim 2, wherein a wall delimiting the U-shaped bend of the second arm exhibits a local reduction in thickness.

4. The device as claimed in claim 1, wherein the second arm includes two plane surfaces at the extremities of the U-shape for attachment of a compression plate for the bearing.

5. The device as claimed in claim 1, wherein the ear is made of aluminum, produced by molding, and the cradle is made of steel.

6. A motor vehicle comprising the body supporting the cradle, wherein the cradle is linked to the structural element of the body by the link device according to claim 1.

7. The device as claimed in claim 1, wherein the cradle is positioned at a front of the vehicle.

8. A link device between a cradle of a motor vehicle and a structural element of a body of the vehicle, the link device comprising:
   a single-piece ear including a base to connect to the cradle, a middle portion that extends vertically from the base, and a first arm that extends from the middle portion and is configured to connect to the structural element of the body,
   wherein the ear includes a second arm that extends longitudinally with respect to the cradle from the middle portion and includes a U-shaped bend in which an anti-roll bar can be accommodated such that at least a part of a weight of the anti-roll bar is supported by the second arm.

* * * * *